(12) United States Patent
Cros

(10) Patent No.: US 12,087,255 B2
(45) Date of Patent: *Sep. 10, 2024

(54) DISPLAY OF OUT-OF-WINDOW STATUS INDICATORS IN A VIRTUAL SHELF OF A DIAGRAM WINDOW

(71) Applicant: BUSINESS OBJECTS SOFTWARE LTD., Dublin (IE)

(72) Inventor: Jean Christophe Cros, Paris (FR)

(73) Assignee: Business Objects Software Ltd., Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/075,743

(22) Filed: Dec. 6, 2022

(65) Prior Publication Data

US 2023/0103152 A1 Mar. 30, 2023

Related U.S. Application Data

(63) Continuation of application No. 17/324,629, filed on May 19, 2021, now Pat. No. 11,545,118.

(51) Int. Cl.
*G09G 5/38* (2006.01)

(52) U.S. Cl.
CPC ........... *G09G 5/38* (2013.01); *G09G 2354/00* (2013.01)

(58) Field of Classification Search
CPC .............................. G09G 5/38; G09G 2354/00
See application file for complete search history.

(56) References Cited

U.S. PATENT DOCUMENTS

| 2008/0307335 | A1* | 12/2008 | Chaudhri | G06F 3/04817 715/764 |
| 2015/0235623 | A1* | 8/2015 | Lin | G06F 3/0481 345/629 |
| 2018/0053328 | A1* | 2/2018 | Simonovic | G06T 11/206 |
| 2018/0089873 | A1* | 3/2018 | Tsukagoshi | G06T 11/60 |

(Continued)

FOREIGN PATENT DOCUMENTS

| CN | 105830005 | | 8/2016 | |
| CN | 105830005 | A * | 8/2016 | ............. G03B 17/54 |

OTHER PUBLICATIONS

Final Office Action in U.S. Appl. No. 17/324,629, dated Jun. 22, 2022, 16 pages.

(Continued)

*Primary Examiner* — Samantha (Yuehan) Wang
(74) *Attorney, Agent, or Firm* — Fish & Richardson P.C.

(57) ABSTRACT

An example method and system for display of out-of-window status indicators in a virtual shelf of a diagram window. A diagram framework displays a first portion of a diagram within a diagram window of a display device. The diagram comprises a set of shapes and a set of connectors representing a corresponding set of relationships between a set of objects. The framework detects that a first shape of the set of shapes at a first position of the first shape and a first status indicator associated with the first shape at a first position of the first status indicator are at least partially outside a first visible portion of the diagram within the diagram window. The diagram framework determines a second position of the first status indicator within the diagram window. The first status indicator at the second position of the first status indicator is displayed within the diagram window.

20 Claims, 7 Drawing Sheets

(56) References Cited

U.S. PATENT DOCUMENTS

2021/0005164 A1* 1/2021 Hayashi .............. G06F 16/9577
2022/0375435 A1* 11/2022 Cros ................... G06F 3/04817

OTHER PUBLICATIONS

Nngroup.com [online], "Visibility of System Status (Usability Heuristic #1)" Jun. 2018, [retrieved on Apr. 29, 2021], retrieved from URL <https://www.nngroup.com/articles/visibility-system-status/>, 12 pages.

Non-Final Office Action in U.S. Appl. No. 17/324,629, dated Jan. 18, 2022, 16 pages.

* cited by examiner

500

502 Displaying a first portion of a diagram within a diagram window of a display device, where the diagram comprises a set of shapes and a set of connectors representing a corresponding set of relationships between a set of objects 504 Detecting a first shape of the set of shapes at a first position of the first shape and a first status indicator associated with the first shape at a first position of the first status indicator to be at least partially outside a first visible portion of the diagram within the diagram window 506 Determining a second position of the first status indicator within the diagram window, where the second position of the first status indicator is on a first line segment from the first position of the first status indicator to a representative position within the diagram window, and is on a first edge region of the diagram window 508 Displaying the first edge region of the diagram window and the first status indicator at the second position of the first status indicator within the diagram window

FIG. 5

DISPLAY OF OUT-OF-WINDOW STATUS INDICATORS IN A VIRTUAL SHELF OF A DIAGRAM WINDOW

CLAIM OF PRIORITY

This application claims priority under 35 USC § 120 to U.S. patent application Ser. No. 17/324,629, filed on May 19, 2021, the entire contents of which are hereby incorporated by reference.

BACKGROUND

Diagrams can be an efficient way to display and interact with a complex set of objects of a model. Shapes in a diagram may represent objects of the model, and connectors between the shapes may represent the relationships between the objects that they represent. Diagrams can be presented for users in a diagram window of a diagram user interface on a display device. A model may be built using the diagram user interface to add, edit, and remove shapes and connectors representing the underlying objects and relationships between them.

Errors may be found in portions of the model during the process of building or executing the model, and can be presented to users viewing the diagram.

SUMMARY

The present disclosure describes methods, systems, and software for displaying out-of-window status indicators in a virtual shelf of a diagram window.

In one implementation, a computer-implemented method is used for providing display of out-of-window status indicators in a virtual shelf of a diagram window. A diagram framework displays a first portion of a diagram within a diagram window of a display device. The diagram comprises a set of shapes and a set of connectors representing a corresponding set of relationships between a set of objects. The framework detects that a first shape of the set of shapes at a first position of the first shape and a first status indicator associated with the first shape at a first position of the first status indicator are at least partially outside a first visible portion of the diagram within the diagram window. The diagram framework determines a second position of the first status indicator within the diagram window. The second position of the first status indicator is on a first line segment from the first position of the first status indicator to a representative position within the diagram window, and is on a first edge region of the diagram window. The framework displays the first edge region of the diagram window and the first status indicator at the second position of the first status indicator within the diagram window.

In some instances, four sectors in the diagram are separated by a first line including an upper left corner and a lower right corner of the diagram window, a second line including an upper right corner and a lower left corner of the diagram window, and an intersection point at the intersection of the first line and the second line. The four sectors include a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

In some instances, the determination of the second position of the first status indicator within the diagram window further comprises the determination, by the diagram framework, which edge region of four edge regions of the diagram window is the first edge region. When the first position of the first status indicator is within the right sector of the diagram, the first edge region is a corresponding right edge region of the diagram window, when the first position of the first status indicator is within the left sector of the diagram, the first edge region is a corresponding left edge region of the diagram window, when the first position of the first status indicator is within the top sector of the diagram, the first edge region is a corresponding top edge region of the diagram window, or when the first position of the first status indicator is within the bottom sector of the diagram, the first edge region is a corresponding bottom edge region of the diagram window. The right sector further comprises an area within the diagram window and an area outside the diagram window. The left sector further comprises an area within the diagram window and an area outside the diagram window. The top sector further comprises an area within the diagram window and an area outside the diagram window, and the bottom sector further comprises an area within the diagram window and an area outside the diagram window.

In some instances, the determination of the second position of the first status indicator within the diagram window further includes a determination, by the framework, of a first edge region intersection point at the intersection of the first line segment and a first edge region line segment, where the first edge region line segment extends the length of the first edge region and is centered between the width of the first edge region. And, an assignment, by the diagram framework, of the second position of the first status indicator at the first edge region intersection point.

In some instances, when the first status indicator is at the second position of the first status indicator within the diagram window, the framework, receives a selection of the first status indicator. In response to receiving the selection of the first status indicator, the diagram framework determines a third position of the first status indicator within the diagram window based on the second position of the first status indicator and a first margin region of the diagram window, where the first margin region comprises the first edge region and the width of the first margin region is greater than or equal to the width of the first edge region. The framework determines a second position of the first shape within the diagram window based on the third position of the first status indicator, where the first status indicator at the third position of the first status indicator is anchored to the first shape at the second position of the first shape. The diagram framework moves the diagram in relation to moving the first status indicator at the second position of the first status indicator to the third position of the first status indicator within the diagram window, where a second visible portion of the moved diagram is within the diagram window. The framework displays the first shape at the second position of the first shape within the diagram window and the first status indicator at the third position of the first status indicator anchored to the first shape within the diagram window.

In some instances, the first status indicator is anchored to the first shape within the first shape, on a border of the first shape, or outside the first shape and touching the border of the first shape. The first shape at the second position of the first shape touches a first side of the first margin region within the diagram window. Moving the first status indicator at the second position of the first status indicator to the third position of the first status indicator within the diagram window includes when the first margin region is a corresponding top margin region of the diagram window or a corresponding bottom margin region of the diagram window, and when the first margin region is a corresponding top margin region of the diagram window, moving the first status indicator vertically downward to a vertical position of the third position of the first status indicator that is equal to or less than a vertical position of a bottom side of the top margin region within the diagram window. When the first margin region is a corresponding bottom margin region of the diagram window, moving the first status indicator vertically upward to a vertical position of the third position of the first status indicator that is equal to or greater than a vertical position of a top side of the bottom margin region within the diagram window. In response to a determination, by the diagram framework, that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window. Or, in response to a determination, by the framework, that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window. When the first margin region is a corresponding right margin region of the diagram window or a corresponding left margin region of the diagram window, and when the first margin region is a corresponding right margin region of the diagram window, moving the first status indicator horizontally leftward to the horizontal position of the third position of the first status indicator that is equal to or less than the horizontal position of the left side of the right margin region of the diagram window. When the first margin region is a corresponding left margin region of the diagram window, moving the first status indicator horizontally rightward to a horizontal position of the third position of the first status indicator that is equal to or greater than the horizontal position of the right side of the left margin region of the diagram window. In response to a determination, by the diagram framework, that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window. Or, in response to a determination, by the framework, that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

In some instances, the representative position within the diagram window is the center of the diagram window, and the width of the first edge region is greater than or equal to the width of the first status indicator. The set of shapes represent a corresponding set of objects of a model, and the set of connectors further represent a corresponding set of relationships between the corresponding set of objects of the model. A status indicator includes a status indicator identification (ID) and status indicator information, where the status indicator information comprises at least one of a searched shape status, a bookmarked shape status, a warning associated with the shape, an error associated with the shape, an information message associated with the shape, or a comment associated with the shape.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages.

First, all badges (also referred herein as status indicators) remain in the diagram window allowing a user to know whether at least one error exists in the diagram or that there are no errors in the diagram. A user is able to trust that the diagram is error free if there are no status indicators representing errors displayed in the diagram window.

Second, a particular status indicator, associated to a particular shape remains the same whether the particular status indicator is anchored to the particular shape or is on a virtual shelf of the diagram window. This is also the case for the association between a particular status indicator and a particular connector.

Third, there is a continuity of positioning of a status indicator during moving or zooming in the diagram when the position of the status indicator changes from being anchored to its associated shape within the diagram window to a position of the status indicator on a virtual shelf, where the associated shape is no longer within the diagram window and is hidden. Moving or zooming the diagram does not cause the status indicator to disappear.

Fourth, when the diagram is moved or zoomed out and the associated shape moves back within the diagram window, the status indicator moves seamlessly back to its original position and anchored on the associated shape.

Fifth, the solution provides a clear distribution of multiple status indicators on one or more virtual shelves, thereby avoiding the status indicators from being tightly gathered together (e.g., the status indicators not being gather in corner of the diagram window), also facilitating readability of the status indictors.

Sixth, by placing a status indicator on a virtual shelf on a side of the diagram window, a user is more readily able to understand which direction its associated shape and the status indicator's original position is in relative to the visible portion of the model. By observing how much the status indicator moves along the virtual shelf when the diagram is moving, the user can have an idea of how far its associated shape is from the center of the diagram window. The more the status indicator moves along the virtual shelf as movement occurs, the nearer the original position of the status indicator and its associated shape.

Seventh, once a user selects a particular status indicator on a virtual shelf, the diagram is automatically moved with minimal movement of the particular status indicator so that its associated shape is moved within the diagram window and the particular status indicator is anchored to it. Thus, the need for the user to move the diagram multiple times to center the shape within the diagram window is reduced or eliminated.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 5 is a flowchart illustrating an example of a computer-implemented method for moving a status indicator anchored to a shape hidden outside a diagram window to a virtual shelf visible within the diagram window, according to an implementation of the present disclosure.

DETAILED DESCRIPTION

Figure 1:
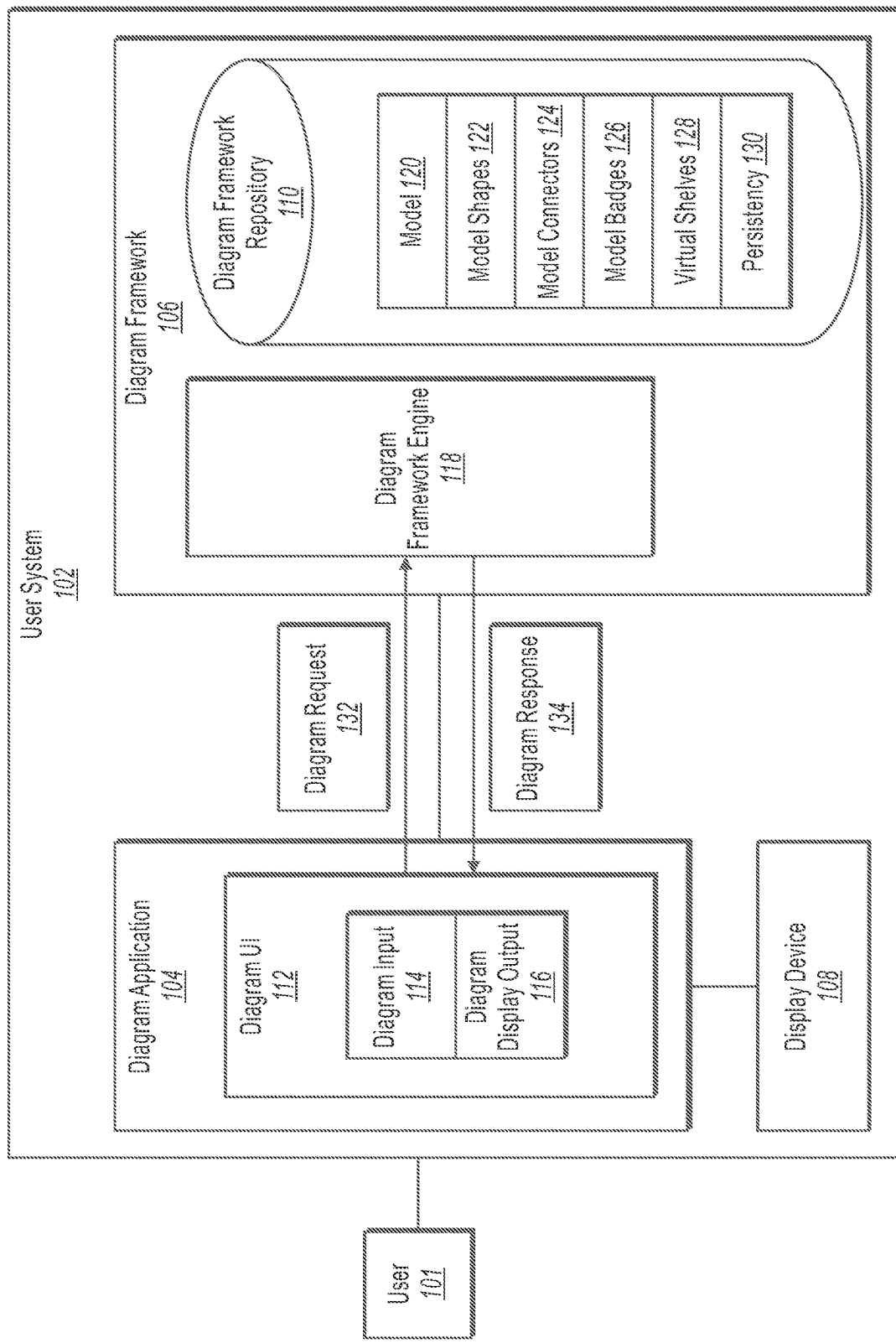
FIG. 1 is a block diagram illustrating an example user system for providing display of out-of-window status indicators in a virtual shelf of a diagram window, according to an implementation of the present disclosure.

The following detailed description describes display of out-of-window status indicators in a virtual shelf of a diagram window, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Diagrams can be an efficient way to display and interact with a complex set of objects of a model, where the objects may be related to one or more of the others objects in the set. Shapes in a diagram may represent objects of the model, and connectors between the shapes may represent the relationships between the objects that they represent. Diagrams can be presented for users in a diagram window of a diagram user interface on a display device. A model may be built using the diagram user interface to add, edit, and remove shapes and connectors representing the underlying objects and relationships between them. A user may use the diagram user interface to display a model to help the user understand the objects of the model and relationships between them. The diagram user interface can be used at both design time and runtime to display a model, and errors with the model can be identified during these times. For example, issues with an in-development model can be identified in these scenarios, as well as a live or real-time executing system where errors in a modeled or illustrated environment are presented. Errors may be found that are associated with a particular shape of the model. Errors may also be found that is associated with a particular connector between two shapes of the model. In some implementations, each of these errors may be represented by a badge or status indicator that is anchored over or near the associated shape or associated connector in the diagram.

In order to address and resolve any errors found in the diagram or the underlying model, a user would need to be made aware of any errors that may exist. One way the user is made aware of an error is by a shape or connector and its associated badge representing the particular error being displayed within the diagram window. To determine if there are errors in the diagram or not, the user needs to fit the complete diagram in the diagram window and see if there any badges associated with any shapes or connectors. However, the portion of the diagram including the shape or connector and its associated badge may not be, or may not fit, within the diagram window and may be hidden, such that the user is unable to see the error(s) such that the error may not be timely and/or efficiently addressed. For example, the user may be zoomed in on and working on a portion of the diagram that is within the diagram window, where the portion of the diagram that includes an error-related badge or other error indicator is not currently visible.

In some implementations, the diagram does not display its current state of either in error or not in error. Even though a user may not see an error within a portion of the diagram within the diagram window, the user may not conclude that there is no error in the diagram, as some errors may be outside the visible portion of the diagram. As such, the user is unable to trust the diagram by looking at only its visible portion, which can become a usability issue. In some instances, the user may need to see additional information outside the diagram window to make this determination. A diagram application may be modified to provide redundant information on the display screen, such as a list of errors, a global error indicator in a tool bar, or a property panel;

however, these additional diagram user interfaces may consume screen space otherwise provided to the diagram window, or the user may have to focus attention alternatively to these diagram user interfaces and the diagram while performing his task on the diagram. In another instance, the user may need to zoom out to see the complete diagram and check for errors, then zoom in again to continue his task, which may take additional time and result in lost productivity.

Methods and systems for displaying out-of-window status indicators in a virtual shelf of a diagram window are disclosed herein. Virtual shelves of a diagram window may be utilized to display out-of-window status indicators even when the shapes associated with the out-of-window status indicators are outside the visible portion of the diagram. The status indicators in the diagram are displayed and visible within the diagram window. A status indicator that is within the visible portion of the diagram remains at its position, usually over and anchored to its associated shape. A status indicator that is outside the diagram window is moved to a position on a virtual shelf of the diagram window, where it is visible and no longer hidden. The calculation of the position of an out-of-window status indicator on a virtual shelf allows out-of-window status indicators to be more evenly distributed around the border of the diagram window and is performed with respect to the direction in which the original hidden position should be. In addition, a selection of a particular status indicator on the virtual shelf results in automatically moving or shifting the diagram to seamlessly make the status indicator and its associated shape visible within the diagram window.

FIG. 1 is a block diagram illustrating an example user system for providing display of out-of-window status indicators in a virtual shelf of a diagram window, according to an implementation of the present disclosure. At a high level, the illustrated user system 102 includes or is made up of one or more communicably coupled computers or other components (see, e.g., FIG. 7). The user system 102 includes a diagram application 104, a diagram framework 106, and a display device 108. The diagram application 104 may include a diagram user interface (UI) 112 having a diagram input 114 and a diagram display output 116. As illustrated, the diagram framework 106 includes a diagram framework repository 110 and a diagram framework engine 118. The diagram framework repository 110 includes a model 120, model shapes 122, model connectors 124, model badges (also referred herein as status indicators) 126, virtual shelves 128, and persistency 130. The diagram framework engine 118 may include diagram framework-side UI functionality. The diagram UI 112 is a user-side UI that may be installed on user system 102 as part of the display application 104. Although the detailed description is focused on display of out-of-window status indicators in a virtual shelf of a diagram window, other functionality is envisioned to be covered by the described subject matter.

The diagram UI 112 of user system 102 allows an end user 101 to build a model including shapes and connectors, where the shapes represent underlying objects of the model, and the connectors represent the relationships between the objects of the model. The diagram UI 112 may also show executing models and systems, where similar error functionality is shown and illustrated. The end user 101 uses the diagram UI 112 to provide diagram input 114 as a diagram request 132 to the diagram framework engine 118 to interact with a portion of a diagram being presented on a diagram window of the display device 108. The diagram framework engine 118 may subsequently provide a diagram response 134 to diagram display output 116 of diagram UI 112 in response to the diagram request 132. Diagram UI 112 may provide diagram display output 116 to be presented in the portion of the diagram being presented on the diagram window of display device 108. The diagram input 114 provided as the diagram request 132 may include a request to add, edit, and remove shapes and connectors of the diagram.

The diagram display output 116 of diagram UI 112, provided as diagram response 134 by diagram framework engine 118, may be an updated diagram, which may include a status indicator that indicates an error with its associated shape or connector. The status indicator may provide the status of a given shape representing an underlying object of the model even if the shape is not visible in the portion of the updated diagram in the diagram window. In some instances, the shape is not visible in the portion of the updated diagram in the diagram window, and the status indicator may be displayed on a virtual shelf of the diagram window along with the portion of the updated diagram in the diagram window. In some implementations, the status indicator may provide status for a searched shaped, a bookmarked shape, a shape with a warning, a shape with an error, a shape with an information message, or a shape with a comment, among other types of shapes. The shapes, the connectors, the status indicators, and the virtual shelves are described in more detail with reference to FIGS. 2, 3, and 4.

The diagram framework repository 110 may include a model 120 of the underlying diagram, model shapes 122 including a set of shapes in the diagram and representing a set of objects of the model at model 120, model connectors 124 including a set of connectors between the shapes that may represent relationships between the objects that they represent, model badges 126 including a set of status indicators that indicate their associated shapes or connections have an error, and virtual shelves 128 having at least one status indicator to be displayed in the diagram window, utilized by one or more users of a plurality of users associated with user system 102.

The diagram framework engine 118 may save the state of the diagram application 104 and the diagram framework 106 in persistency 130, when the user 101 ends the diagram application 104. The diagram framework engine 118 may restore the state of the diagram application 104 and the diagram framework 106 from persistency 130, such as when the user 101 restarts the diagram application 104, or when the user returns to a particular diagram.

The diagram framework repository 110 may further comprise a database and a set of database access functions. The diagram framework repository 110 may comprise a relational database, for example, a SAP HANA in-memory, column-oriented, relational database management system, a Microsoft SQL server relational database management system, an open data protocol (OData) based database, a representational state transfer (REST) based database, or any other suitable type of database system.

During operation, the diagram framework engine 118 of the diagram framework 106 may display a first portion of a diagram within a diagram window of the display device 108. The diagram may comprise a set of shapes and a set of connectors representing a corresponding set of relationships between a set of objects.

The diagram framework engine 118 may detect that a first shape of the set of shapes at a first position of the first shape and a first status indicator associated with the first shape at a first position of the first status indicator are at least partially outside a first visible portion of the diagram within the diagram window.

The diagram framework engine 118 can determine a second position of the first status indicator within the diagram window. The second position of the first status indicator may be on a first line segment from the first position of the first status indicator to a representative position within the diagram window, and may be on a first edge region of the diagram window.

The diagram framework engine 118 can display the first edge region of the diagram window and the first status indicator at the second position of the first status indicator within the diagram window.

Figure 2:
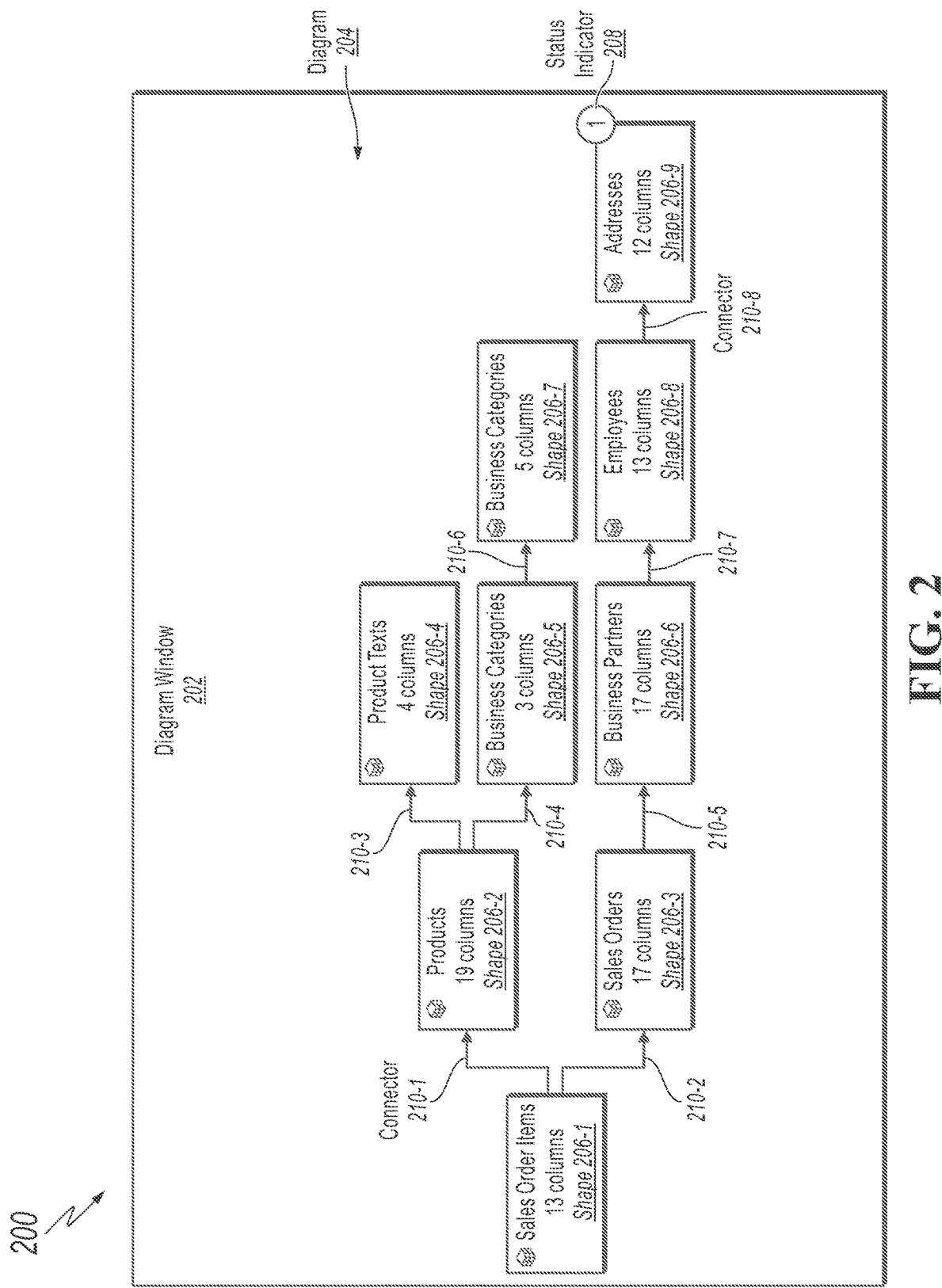
FIG. 2 is a screenshot of an example populated diagram user interface for end user interactions with a diagram illustrating a set of shapes and associated status indicators visible in a diagram window, according to an implementation of the present disclosure.

FIG. 2 is a screenshot of an example populated diagram UI 200 for end user interactions with a diagram illustrating a set of shapes and associated status indicators visible in a diagram window, according to an implementation of the present disclosure. As shown, diagram UI 200 is populated with a diagram 204, which is presented on a diagram window 202 of a display device 108 of user system 102 (see FIG. 1). Diagram 204 includes a set of shapes 206 including shapes 206-1 through 206-9, and a set of connectors 210 including connectors 210-1 through 210-8. Each of the connectors 210 provide a connection from one shape 206 to one or more other shapes 206, where the connectors 210 are directional in the direction depicted by the single headed arrow. For example, shape 206-1 is connected to shapes 206-2 and 206-3, shape 206-2 is connection to shapes 206-4 and 206-5, and shape 206-8 is connected to shape 206-9. Diagram 204 also includes a status indicator 208 that is associated with and anchored to shape 206-9 indicating that shape 206-9 and its underlying object has an error that would need to be addressed. The particular names of the shapes 206 illustrated herein are only an example—any other suitable shapes or model can be used in other implementations.

The shapes 206 shown in FIG. 2 each have the same rectangular shape with rounded corners and each shape 206 has the same size. In some implementations, the shapes 206 may all have the same shape, or may include at least one shape 206 that has a different shape than at least one other shape 206. In some instances, a shape 206 may be any shape including a round shape, a square shape, a rectangle shape, a rectangular shape with rounded corners, a circle shape, an oval shape, an elliptical shape, or any other type of shape. In other instances, the shapes 206 may all have the same size or may include at least one shape 206 that has a different size than at least one other shape 206.

Similarly, the status indicator 208 is shown as a circle of a particular size in FIG. 2. In some implementations, status indicators 208 may all have the same shape or may include at least one status indicator 208 that has a different shape than at least one other status indicator 208. In some instances, a status indicator 208 may be any shape including a round shape, a square shape, a rectangle shape, a rectangular shape with rounded corners, a circle shape, an oval shape, an elliptical shape, or any other type of shape. In other instances, the status indicator 208 may all have the same size or may include at least one status indicator 208 that has a different size than at least one other status indicator 208.

A status indicator 208 may include a status indicator identification (ID) and status indicator information, where the status indicator information may comprise at least one of a searched shape status, a bookmarked shape status, a warning associated with the shape, an error associated with the shape, an information message associated with the shape, or a comment associated with the shape.

The status indicator 208 is shown as anchored to the upper right corner of shape 206-9 in FIG. 2. In some implementations, a status indicator 208 may be positioned and anchored anywhere in, on any border, or any corner of its associated shape 206. In some instances, a status indicator 208 may also be positioned inside or near but outside its associated shape 206.

Figure 3:
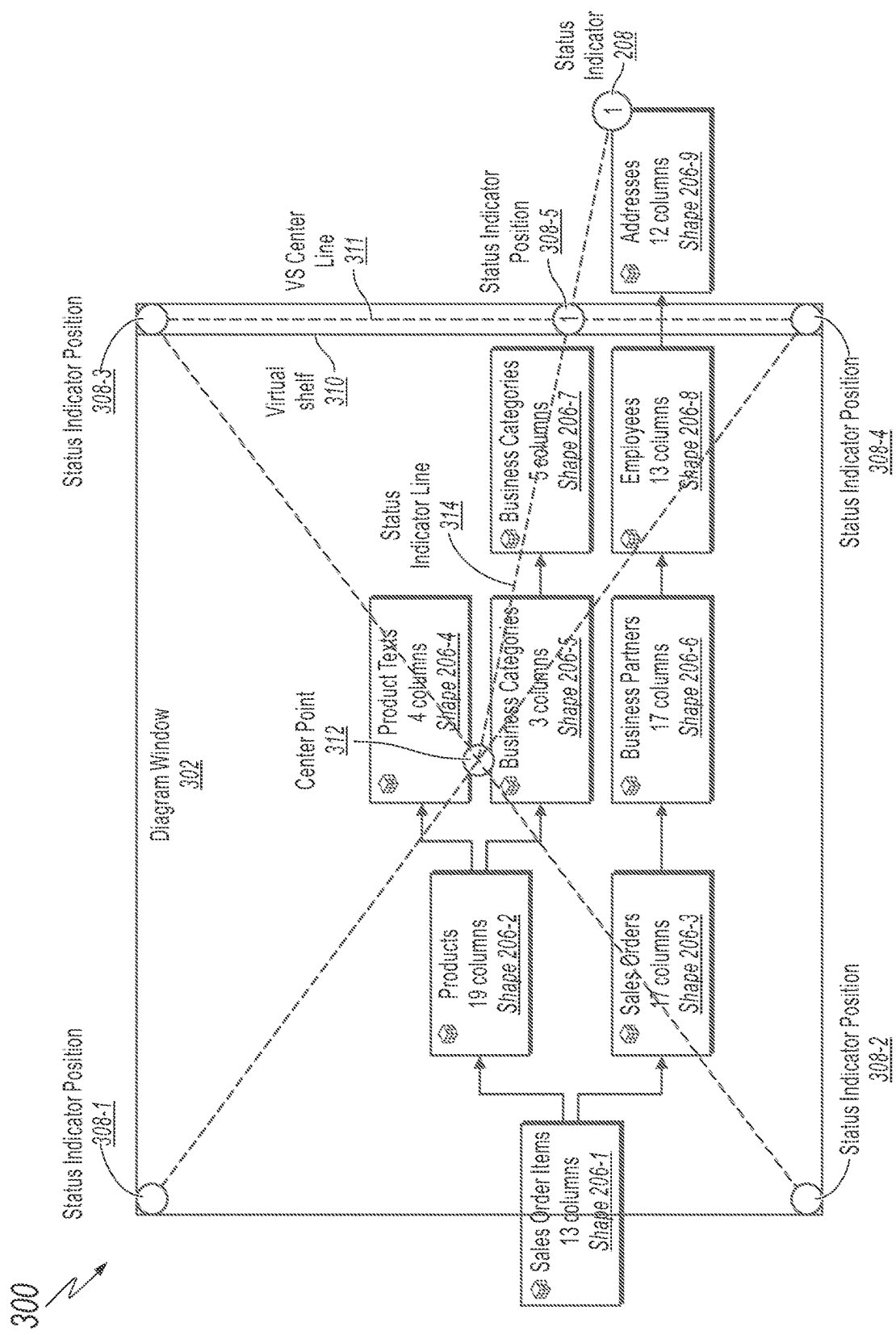
FIG. 3 is another screenshot of an example populated diagram user interface for end user interactions with a diagram illustrating movement of a status indicator anchored to a shape hidden outside a diagram window to a virtual shelf visible within the diagram window, according to an implementation of the present disclosure.

FIG. 3 is another screenshot of an example populated diagram user interface 300 for end user interactions with a diagram illustrating movement of a status indicator anchored to a shape hidden outside a diagram window to a virtual shelf visible within the diagram window, according to an implementation of the present disclosure. As shown, diagram UI 300 is populated with a portion of diagram 204 (see FIG. 2), which is presented on a diagram window 302. The portion of diagram 204 visible within diagram window 302 includes partially visible shape 206-1 and visible shapes 206-2 through 206-8. Shape 206-9 and its associated status indicator 208 are outside diagram window 302, and are thus hidden from the current view.

Diagram window 302 also includes a virtual shelf 310 that may be used to display the hidden status indicator 208 at status indicator position 308-5 when the hidden status indicator 208 is moved from a first position of status indicator 208 to a second status indicator position 308-5 on virtual shelf 310. When a status indicator 208 is partially or completely outside the diagram window 302, where the status indicator is partially hidden or completely hidden, it may be moved from an initial position of the status indicator 208 to a second status indicator position of the status indicator 208 on the virtual shelf 310. The status indicator 208 may stay on the virtual shelf 310 so that the status indicator 208 remains visible within the diagram window 302. In some implementations, the opacity of the virtual shelf 310 can be set to any value in a range from completely invisible to opaque based on a visualization setting that may have a default setting or may be set by the user 101. In some instances, a virtual shelf 310 may be illustrated as shaded, colored, or any other type of illustration, or it could be an invisible or non-denoted area reserved for status indicators 208. When a particular status indicator 208 is visible in the diagram window 302, the particular status indicator 208 remains at its normal position anchored to its associated shape 206.

When the diagram framework engine 118 may detect that a shape, such as shape 206-9, at a first position of the shape 206-9 and a status indicator, such as status indicator 208, associated with the shape 206-9 at a first position of the status indicator 208 are at least partially outside a first visible portion of the diagram 204 within the diagram window 302.

The diagram framework engine 118 can determine a second status indicator position 308-5 of the status indicator 208 within the diagram window 302. The status indicator position 308-5 of the status indicator 208 is on a status indicator line 314 from the first position of the status indicator 208 to a representative position, such as center point 312, within the diagram window 302, and is on a first edge region, such as virtual shelf 310 of the diagram window 302.

The diagram framework engine 118 can display virtual shelf 310 of the diagram window 302 and status indicator 208 at the status indicator position 308-5 of the status indicator 208 within the diagram window 302.

In some instances, four sectors in the diagram 204 are separated by a first line including an upper left corner and a lower right corner of the diagram window 302, a second line including an upper right corner and a lower left corner of the diagram window 302, and an intersection point, the center point 312, at the intersection of the first line and the second line. The four sectors include a right sector comprising the upper right corner, the center point 312, and the lower right corner, a bottom sector comprising the lower right corner, the center point 312, and the lower left corner, a left sector comprising the upper left corner, the center point 312, and the lower left corner, and a top sector comprising the upper left corner, the center point 312, and the upper right corner. The particular lines may or may not be visible to users in the diagram window 302.

In some instances, determining the second position of the status indicator 208 within the diagram window 302 may include determining, by the diagram framework engine 118, which edge region of four edge regions of the diagram window is the first edge region. When the first position of the first status indicator is within the right sector of the diagram 204, the first edge region is a corresponding right edge region of the diagram window 302. When the first position of the status indicator 208 is within the left sector of the diagram 204, the first edge region is a corresponding left edge region of the diagram window 302, and when the first position of the status indicator 208 is within the top sector of the diagram 204, the first edge region is a corresponding top edge region of the diagram window 302. When the first position of the status indicator 208 is within the bottom sector of the diagram 204, the first edge region is a corresponding bottom edge region of the diagram window 302.

The right sector further comprises an area within the diagram window 302 and an area outside the diagram window 302. The left sector further comprises an area within the diagram window 302 and an area outside the diagram window 302. The top sector further comprises an area within the diagram window 302 and an area outside the diagram window 302, and the bottom sector further comprises an area within the diagram window 302 and an area outside the diagram window 302.

In some instances, once the particular sector is found, a corresponding virtual shelf 301 is determined and will be utilized for the status indicator 208 to be displayed on. For example, the right sector has a corresponding right edge region and a right virtual shelf 310, the left sector has a corresponding left edge region and a left virtual shelf 310, the top sector has a corresponding top edge region and a top virtual shelf 310, and the bottom sector has a corresponding bottom edge region and a bottom virtual shelf 310.

In some instances, the determination of the status indicator position 308-5 of the status indicator 208 within the diagram window 302 further includes a determination, by the diagram framework engine 118, of a first edge region intersection point at the intersection of the status indicator line 314 and a first edge region virtual shelf line 311, where the virtual shelf line 311 extends the length of the virtual shelf 310 and is centered between the width of the virtual shelf 310. Then, the diagram framework engine 118 can assign the status indicator position 308-5 of the status indicator 208 at the first edge region intersection point.

The calculation and determination of the second position of the status indicator 208 and the determination of the first edge region intersection point at the intersection of a corresponding status indicator line 314 and a corresponding first edge region virtual shelf line 311 is processed in a similar manner for a left virtual shelf, a top virtual shelf, or a bottom virtual shelf as the right virtual shelf are processed.

In some implementations, more than one status indicator 208 may have a position on a virtual shelf 310 that is the same position or a position very near the more than one status indicators 208. Without adjustments, this may result in several of the status indicators 208 laying on or being presented within the virtual shelf 310 on top of or overlapping with each other. To mitigate or prevent this from happening, the diagram framework engine 118 may apply a shift in position to one or more of the several status indicators 208 that are currently overlapping or close to each other to shift them apart, while keeping the several status indicators 208 in the same general area on the virtual shelf 310.

Figure 4:
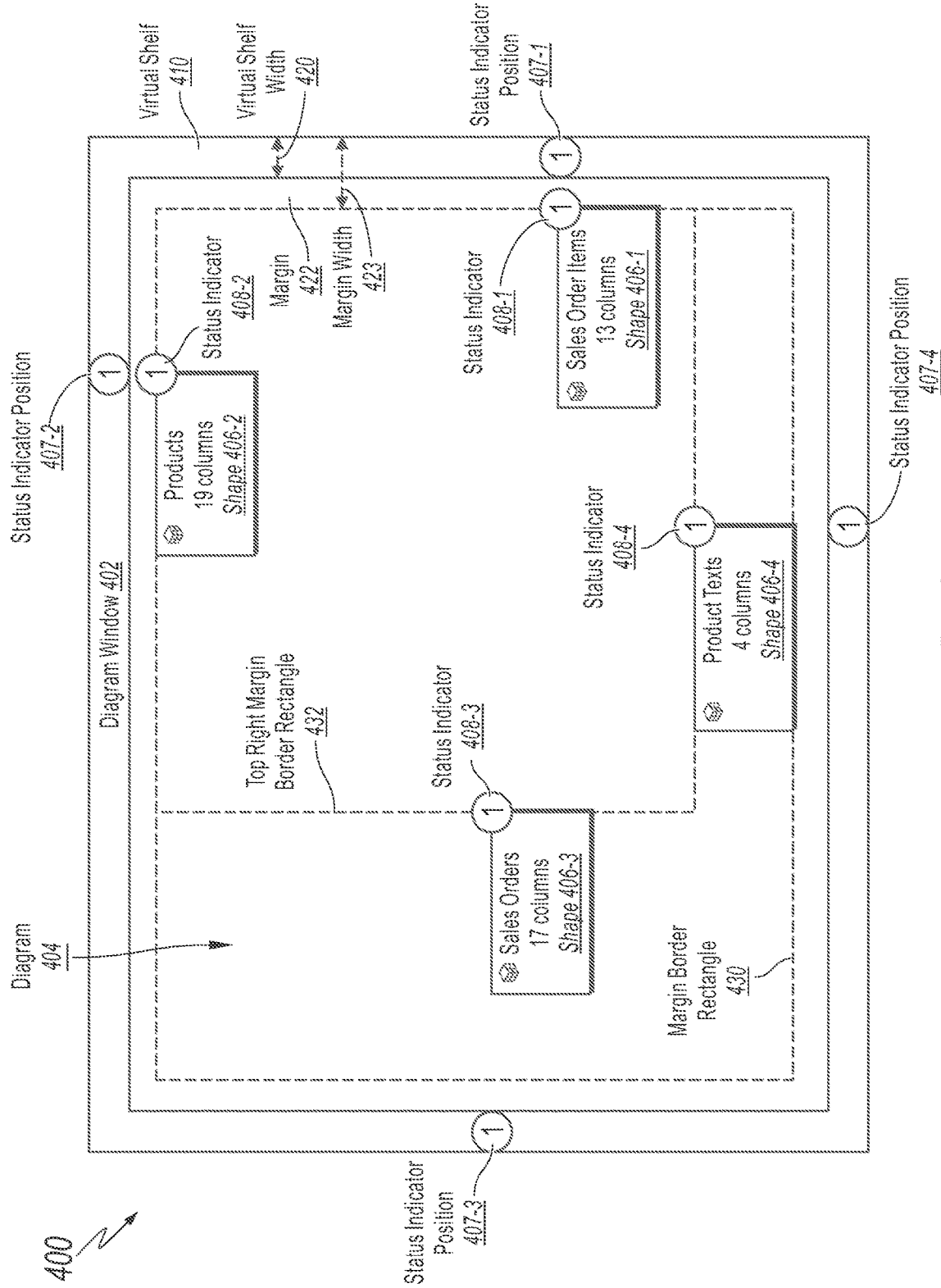
FIG. 4 is another screenshot of an example populated diagram user interface for end user interactions with a diagram illustrating movement of a status indicator on a visible shelf within the diagram window to a position visible within the diagram window and anchored to the associated shape visible within the diagram window, according to an implementation of the present disclosure.

FIG. 4 is another screenshot of an example populated diagram UI 400 for end user interactions with a diagram illustrating movement of a status indicator on a visible shelf within the diagram window to a position visible within the diagram window and anchored to the associated shape visible within the diagram window, according to an implementation of the present disclosure.

As shown, diagram UI 400 is populated with shapes 406 including shapes 406-1 through 406-4, status indicators 408 including status indicators 408-1 through 408-4, and status indicator positions 407 including status indicator positions 407-1 through 407-4, which are presented on a diagram window 402. Status indicator positions 407 are the positions of corresponding status indicators 408 when their associated shapes 406 were outside the diagram window 402 and were hidden. Status indicators 408 are at the positions when their associated shapes 406 are moved into the visible portion of the diagram in diagram window 402. Diagram window 402 also includes a virtual shelf 410 with a virtual shelf width 420 and that borders the perimeter edge of diagram window 402, and a margin 422 that has a margin width 423, and that borders the perimeter edge of diagram window 402, comprises virtual shelf 410, and is within diagram window 402. The margin width 423 is greater than or equal to the virtual shelf width 420.

The inside edge of margin 422 defines a margin border rectangle 430 within diagram window 402. A top right margin border rectangle 432 is also defined by the top and right inside edges of margin 422, a bottom inside edge of margin 422 and the height of shape 406-4, and a left edge of margin 422 and the width of shape 406-3. By defining the margin border rectangle 430 and the top right margin border rectangle 432 in this way, the position of the status indicator 408 anchored to the corresponding shape 406, and the height and width of the corresponding shape 406 may be taken into account when determining the position to move the corresponding shape 406 into the visible portion of the diagram 402 within the diagram window 402.

The diagram framework engine 118 may utilize some constraints on the position of the status indicator 408 within the diagram window 402 to mitigate or avoid cases where the size of the shape 406 may be too big and only a portion the shape 406 may be displayed in the diagram window 402. The constraints may include, but are not limited to, constraining the position of the status indicator 408, ensuring that the width of the top right margin border rectangle 432 may not be greater than the width of the diagram window 402 minus the margin width 423, and ensuring that the height of the top right margin border rectangle 432 cannot be greater than the height of the diagram window 402 minus the margin width 423, among others. Once a user has selected the particular status indicator 408, the diagram framework engine 118 may utilize the top right margin border rectangle 432 and the initial status indicator position 407 of the particular status indicator 408 on the virtual shelf 410 to determine the second position of the particular status indicator 408. The vector between the initial status indicator position 407 and the second position of the particular status indicator 408 may provide the displacement that the diagram framework engine 118 may apply to the diagram 402.

When a status indicator 408 is at the corresponding status indicator position 407 of the status indicator 408 within the diagram window 402, the diagram framework engine 118 receives a selection of the status indicator 408, such as from user input.

In response to receiving the selection of the status indicator 408, the diagram framework engine 118 determines a second position of the status indicator 408 within the diagram window 402 based on the status indicator position 407 of the corresponding status indicator 408 and a first margin region of the margin 422 of the diagram window 402, where the first margin region of the margin 422 comprises the first edge region of the virtual shelf 410 and the margin width 422 is greater than or equal to the virtual shelf width 420.

The diagram framework engine 118 determines a second position of the corresponding shape 406 within the diagram window 302 based on the second position of the status indicator 408, where the status indicator 408 at the second position of the status indicator 408 is anchored to the corresponding shape 406 at the second position of the corresponding shape 406.

The diagram framework engine 118 moves the status indicator 408 at the status indicator position 407 of the status indicator 408 to the second position of the status indicator 408 within the diagram window 402, which causes the diagram 404 to move in relation to the movement of the status indicator 408 to the second position of the status indicator 408. After moving the diagram 404, a second portion of the moved diagram 404 is visible within the diagram window 402.

The diagram framework engine 118 can display the corresponding shape 406 at the second position of the corresponding shape 406 within the diagram window 402, and can display the status indicator 408 at the second position of the status indicator 408 anchored to the corresponding shape 406 within the diagram window 402.

In some implementations, moving the status indicator 408 to the second position of the status indicator 408 within the diagram window 402 may also include, when the first edge region of the virtual shelf 410 is a corresponding top edge region of the virtual shelf 410 of the diagram window 402, the moving the status indicator 408 vertically on a top side of the top right margin border rectangle 432. In response to determining that a horizontal position of the status indicator position 407 of the status indicator 408 is less than a horizontal position of a left side of the top right margin border rectangle 432, the diagram framework engine 118 can move the status indicator 408 horizontally to a top left corner of the top right margin border rectangle 432. Alternatively, in response to determining that the horizontal position of the status indicator position 407 of the status indicator 408 is greater than a horizontal position of a right side of the top right margin border rectangle 432, the diagram framework engine 118 can move the status indicator 408 horizontally to a top right corner of the top right margin border rectangle 432.

When the first edge region of the virtual shelf 410 is a corresponding bottom edge region of the virtual shelf 410 of the diagram window 402, the diagram framework engine 118 can move the status indicator 408 vertically on a bottom side of the top right margin border rectangle 432. In response to determining that the horizontal position of the status indicator position 407 of the status indicator 408 is less than the horizontal position of the left side of the top right margin border rectangle 432, the diagram framework engine 118 can move the status indicator 408 horizontally to a bottom left corner of the top right margin border rectangle 432. Or, in response to determining that the horizontal position of the status indicator position 407 of the status indicator 408 is greater than a horizontal position of the right side of the first rectangle, the diagram framework engine 118 can move the status indicator 408 horizontally to a bottom right corner of the top right margin border rectangle 432.

When the first edge region of the virtual shelf 410 is a corresponding right edge region of the virtual shelf 410 of the diagram window 402, the diagram framework engine 118 can move the status indicator 408 horizontally on the right side of the top right margin border rectangle 432. In response to determining that a vertical position of the status indicator position 407 of the status indicator 408 is less than a vertical position of the bottom side of the top right margin border rectangle 432, the diagram framework engine 118 can move the status indicator 408 vertically to the bottom right corner of the top right margin border rectangle 432. Or, in response to determining that the vertical position of the status indicator position 407 of the status indicator 408 is greater than a vertical position of the top side of the top right margin border rectangle 432, the diagram framework engine 118 can move the status indicator 408 vertically to the top right corner of the top right margin border rectangle 432.

When the first edge region of the virtual shelf 410 is a corresponding left edge region of the virtual shelf 410 of the diagram window, the diagram framework engine 118 can move the status indicator 408 horizontally on the left side of the top right margin border rectangle 432. In response to determining that the vertical position of the status indicator position 407 of the status indicator 408 is less than the vertical position of the bottom side of the top right margin border rectangle 432, the diagram framework engine 118 can move the status indicator 408 vertically to the bottom left corner of the top right margin border rectangle 432. Or, in response to determining that the vertical position of the status indicator position 407 of the status indicator 408 is greater than the vertical position of the top side of the top right margin border rectangle 432, the diagram framework engine 118 can move the status indicator 408 vertically to the top left corner of the top right margin border rectangle 432.

In some implementations, the status indicators 408 may be anchored to their associated shapes at an upper left corner, a lower left corner, or a lower right corner, and moving the diagram 404 in relation to moving the status indicator 408 at the status indicator position 407 of the status indicator 408 to the second position of the status indicator 408 within the diagram window 402 may be performed in similar manner as the process previously described. Instead of using a top right margin border rectangle 432 for status indicators anchored to a right upper corner of a shape 406, a top left, a bottom left, or a bottom right margin border rectangle may be utilized for status indicators anchored to a respective left upper corner, a left lower corner, or a lower right corner of a shape 406.

FIG. 5 is a flowchart illustrating an example of a computer-implemented method used for moving a status indicator anchored to a shape hidden outside a diagram window to a virtual shelf visible within the diagram window, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order. In the current example, the operations of method 500 are performed by a display framework, such as the framework described in prior solutions. The display framework may be an inherent portion of an operating system, browser, or other application in some instances. The framework may also be a standalone component or application interacting with other described components.

At 502, a diagram framework displays a first portion of a diagram within a diagram window of a display device. The diagram comprises a set of shapes and a set of connectors representing a corresponding set of relationships between a set of objects.

In some implementations, the set of shapes represent a corresponding set of objects of a model and the set of connectors further represent a corresponding set of relationships between the corresponding set of objects of the model. From 502, method 500 proceeds to 504.

At 504, a first shape of the set of shapes at a first position of the first shape and a first status indicator associated with the first shape at a first position of the first status indicator are detected, by the framework, to be at least partially outside a first visible portion of the diagram within the diagram window.

In some implementations, a status indicator includes a status indicator identification (ID) and status indicator information, where the status indicator information comprises at least one of a searched shape status, a bookmarked shape status, a warning associated with the shape, an error associated with the shape, an information message associated with the shape, or a comment associated with the shape. From 504, method 500 proceeds to 506.

At 506, the diagram framework determines a second position of the first status indicator within the diagram window. The second position of the first status indicator is on a first line segment from the first position of the first status indicator to a representative position within the diagram window, and is on a first edge region of the diagram window.

In some implementations, the representative position within the diagram window is the center of the diagram window, and the width of the first edge region is greater than or equal to the width of the first status indicator.

In some implementations, four sectors in the diagram are separated by a first line running from an upper left corner to a lower right corner of the diagram window, a second line running from an upper right corner to a lower left corner of the diagram window. An intersection point between the lines may be present at the intersection of the first line and the second line. The four sectors include a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

In some implementations, the determination of the second position of the first status indicator within the diagram window further includes determining, by the diagram framework, which edge region of four edge regions of the diagram window is the first edge region. When the first position of the first status indicator is within the right sector of the diagram, the first edge region is a corresponding right edge region of the diagram window, when the first position of the first status indicator is within the left sector of the diagram, the first edge region is a corresponding left edge region of the diagram window, when the first position of the first status indicator is within the top sector of the diagram, the first edge region is a corresponding top edge region of the diagram window, or when the first position of the first status indicator is within the bottom sector of the diagram, the first edge region is a corresponding bottom edge region of the diagram window. The right sector further comprises an area within the diagram window and an area outside the diagram window. The left sector further comprises an area within the diagram window and an area outside the diagram window. The top sector further comprises an area within the diagram window and an area outside the diagram window, and the bottom sector further comprises an area within the diagram window and an area outside the diagram window.

In some implementations, the determination of the second position of the first status indicator within the diagram window further includes determining, by the framework, a first edge region intersection point at the intersection of the first line segment and a first edge region line segment, where the first edge region line segment extends the length of the first edge region and is centered between the width of the first edge region. Then, the diagram framework can assign the second position of the first status indicator at the first edge region intersection point. From 506, method 500 proceeds to 508.

At 508, the diagram framework displays the first edge region of the diagram window and the first status indicator at the second position of the first status indicator within the diagram window.

In some implementations, when the first status indicator is at the second position of the first status indicator within the diagram window, the framework receives a selection of the first status indicator. In response to receiving the selection of the first status indicator, the diagram framework determines a third position of the first status indicator within the diagram window based on the second position of the first status indicator and a first margin region of the diagram window, where the first margin region comprises the first edge region and the width of the first margin region is greater than or equal to the width of the first edge region.

The framework determines a second position of the first shape within the diagram window based on the third position of the first status indicator, where the first status indicator at the third position of the first status indicator is anchored to the first shape at the second position of the first shape.

The diagram framework moves the first status indicator at the second position of the first status indicator to the third position of the first status indicator within the diagram window, which causes the diagram to move in relation to the movement of the status indicator to the third position of the first status indicator. After moving the diagram, a second portion of the moved diagram is visible within the diagram window.

The framework displays the first shape at the second position of the first shape within the diagram window and the first status indicator at the third position of the first status indicator anchored to the first shape within the diagram window.

In some implementations, the first status indicator is anchored to the first shape within the first shape, on a border of the first shape, or outside the first shape and touching the border of the first shape. The first shape at the second position of the first shape touches a first side of the first margin region within the diagram window. Moving the first status indicator at the second position of the first status indicator to the third position of the first status indicator within the diagram window includes, when the first margin region is a corresponding top margin region of the diagram window or a corresponding bottom margin region of the diagram window, and when the first margin region is a corresponding top margin region of the diagram window, moving the first status indicator vertically downward to a vertical position of the third position of the first status indicator that is equal to or less than a vertical position of a bottom side of the top margin region within the diagram window.

When the first margin region is a corresponding bottom margin region of the diagram window, the first status indicator is moved vertically upward to a vertical position of the third position of the first status indicator. The vertical position of the third position of the first status indicator is greater than or equal to a vertical position of a top side of the bottom margin region within the diagram window.

In response to determining that a horizontal position of the second position of the first status indicator is less than a horizontal position of a right side of a left margin region of the diagram window, the first status indicator is moved horizontally rightward to a horizontal position of the third position of the first status indicator that is equal to or greater than the horizontal position of the right side of the left margin region of the diagram window.

Or, in response to determining that the horizontal position of the second position of the first status indicator is greater than a horizontal position of a left side of a right margin region of the diagram window, the first status indicator is moved horizontally leftward to the horizontal position of the third position of the first status indicator that is equal to or less than the horizontal position of the left side of the right margin region of the diagram window.

When the first margin region is a corresponding right margin region of the diagram window or a corresponding left margin region of the diagram window, and when the first margin region is a corresponding right margin region of the diagram window, the first status indicator is moved horizontally leftward to the horizontal position of the third position of the first status indicator that is equal to or less than the horizontal position of the left side of the right margin region of the diagram window.

When the first margin region is a corresponding left margin region of the diagram window, the first status indicator is moved horizontally rightward to a horizontal position of the third position of the first status indicator that is equal to or greater than the horizontal position of the right side of the left margin region of the diagram window.

In response to determining that the vertical position of the second position of the first status indicator is less than the vertical position of the top side of the bottom margin region within the diagram window, the first status indicator is moved vertically upward to the vertical position of the third position of the first status indicator that is equal to or greater than the vertical position of the top side of the bottom margin region within the diagram window.

In response to determining that the vertical position of the second position of the first status indicator is greater than the vertical position of the bottom side of the top margin region within the diagram window, the first status indicator is moved vertically downward to the vertical position of the third position of the first status indicator that is equal to or less than the vertical position of the bottom side of the top margin region within the diagram window. After 508, method 500 stops.

Figure 6:
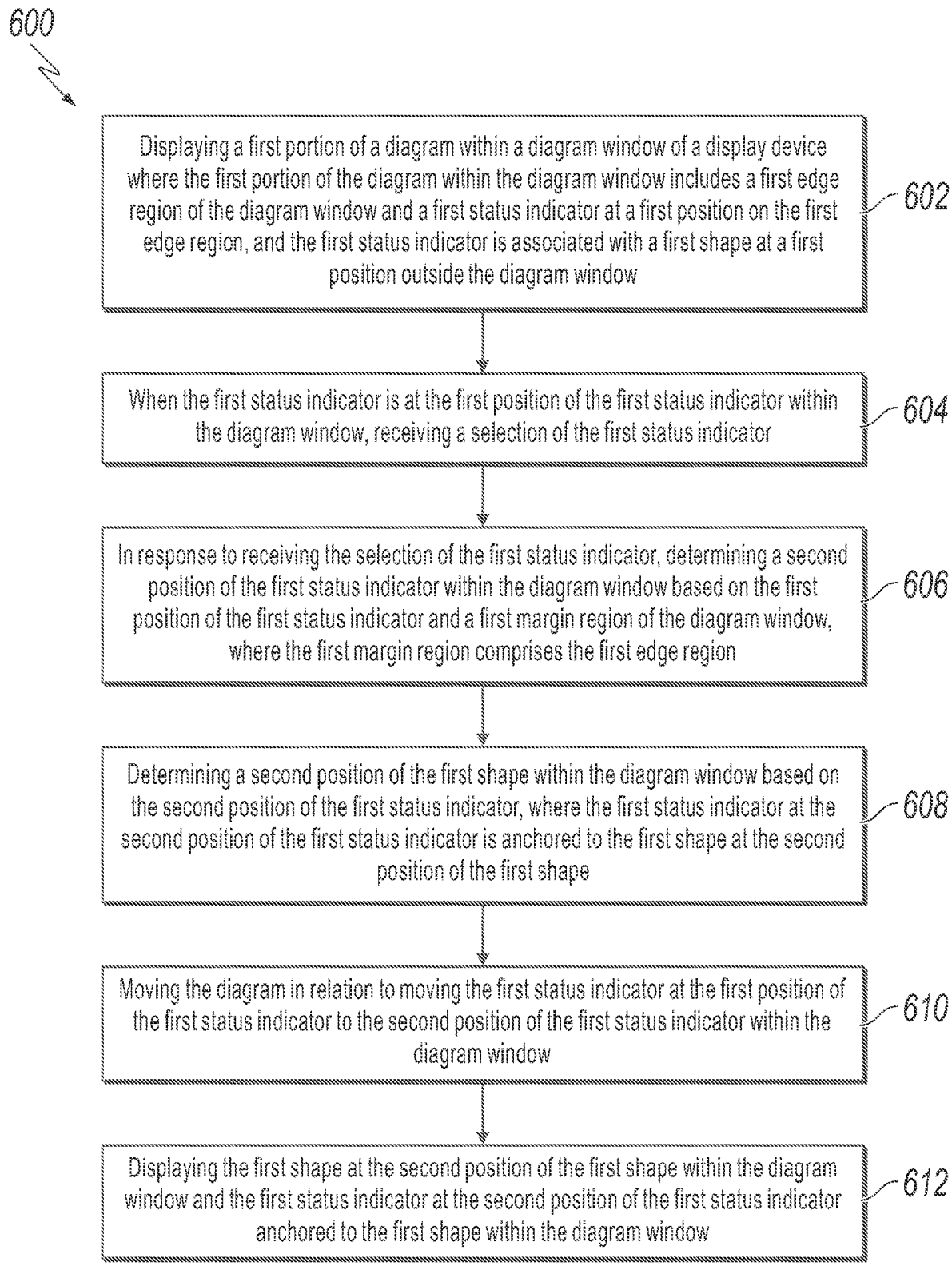
FIG. 6 is a flowchart illustrating an example of a computer-implemented method for moving a status indicator on a visible shelf within the diagram window to a position visible within the diagram window and anchored to the associated shape visible within the diagram window, according to an implementation of the present disclosure.

FIG. 6 is a flowchart illustrating an example of a computer-implemented method for moving a status indicator on a visible shelf within the diagram window to a position visible within the diagram window and anchored to the associated shape visible within the diagram window, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order. In the current example, the operations of method 600 are performed by a diagram framework, such as the framework described in prior solutions. The diagram framework may be an inherent portion of an operating system, browser, or other application in some instances. The framework may also be a standalone component or application interacting with other described components.

At 602, a diagram framework displays a first portion of a diagram within a diagram window of a display device. The diagram comprises a set of shapes, a set of status indicators, and a set of connectors representing a corresponding set of relationships between a set of objects. Each status indicator of the set of status indicators is associated with a unique shape of the set of shapes. The first portion of the diagram visible within the diagram window includes a first edge region of the diagram window and a first status indicator at a first position of the first status indicator on the first edge region of the diagram window. The first status indicator is associated with a first shape at a first position of the first shape, where the first shape at the first position is hidden outside the diagram window. From 602, method 600 proceeds to 604.

At 604, the framework receives a selection of the first status indicator. In this instance, the first status indicator is at the first position of the first status indicator within the diagram window. From 604, method 600 proceeds to 606.

At 606, in response to receiving the selection of the first status indicator, the diagram framework determines a second position of the first status indicator within the diagram window based on the first position of the first status indicator and a first margin region of the diagram window. The first margin region comprises the first edge region and the width of the first margin region is greater than or equal to the width of the first edge region. From 606, method 600 proceeds to 608.

At 608, the framework determines a second position of the first shape within the diagram window based on the second position of the first status indicator. The first status indicator at the second position of the first status indicator is anchored to the first shape at the second position of the first shape.

In some implementations, the first status indicator is anchored to the first shape within the first shape, on a border of the first shape, or outside the first shape and touching the border of the first shape. The first shape at the second position of the first shape touches a first side of the first margin region within the diagram window. From 608, method 600 proceeds to 610.

At 610, the diagram framework moves the diagram in relation to moving the first status indicator at the first position of the first status indicator to the second position of the first status indicator within the diagram window, where a second visible portion of the moved diagram is within the diagram window.

In some implementations, moving the first status indicator at the first position of the first status indicator to the second position of the first status indicator within the diagram window includes, when the first margin region is a corresponding top margin region of the diagram window or a corresponding bottom margin region of the diagram window, and when the first margin region is a corresponding top margin region of the diagram window, moving the first status indicator vertically downward to a vertical position of the second position of the first status indicator that is equal to or less than a vertical position of a bottom side of the top margin region within the diagram window.

Alternatively, when the first margin region is a corresponding bottom margin region of the diagram window, the first status indicator is moved vertically upward to a vertical position of the second position of the first status indicator that is equal to or greater than a vertical position of a top side of the bottom margin region within the diagram window. In response to a determination, by the diagram framework, that a horizontal position of the first position of the first status indicator is less than a horizontal position of a right side of a left margin region of the diagram window, the first status indicator is moved horizontally rightward to a horizontal position of the second position of the first status indicator that is equal to or greater than the horizontal position of the right side of the left margin region of the diagram window. In response to a determination that the horizontal position of the first position of the first status indicator is greater than a horizontal position of a left side of a right margin region of the diagram window, the first status indicator is moved horizontally leftward to the horizontal position of the second position of the first status indicator that is equal to or less than the horizontal position of the left side of the right margin region of the diagram window. When the first margin region is a corresponding right margin region of the diagram window or a corresponding left margin region of the diagram window, and when the first margin region is a corresponding right margin region of the diagram window, the first status indicator is moved horizontally leftward to the horizontal position of the second position of the first status indicator that is equal to or less than the horizontal position of the left side of the right margin region of the diagram window. When the first margin region is a corresponding left margin region of the diagram window, the first status indicator is moved horizontally rightward to a horizontal position of the second position of the first status indicator that is equal to or greater than the horizontal position of the right side of the left margin region of the diagram window. In response to a determination, by the diagram framework, that the vertical position of the first position of the first status indicator is less than the vertical position of the top side of the bottom margin region within the diagram window, the first status indicator is moved vertically upward to the vertical position of the second position of the first status indicator that is equal to or greater than the vertical position of the top side of the bottom margin region within the diagram window. Or, in response to a determination, by the framework, that the vertical position of the first position of the first status indicator is greater than the vertical position of the bottom side of the top margin region within the diagram window, the first status indicator is moved vertically downward to the vertical position of the second position of the first status indicator that is equal to or less than the vertical position of the bottom side of the top margin region within the diagram window. From 610, method 600 proceeds to 612.

At 612, the framework displays the first shape at the second position of the first shape within the diagram window and the first status indicator at the second position of the first status indicator anchored to the first shape within the diagram window.

After 612, method 600 stops.

Figure 7:
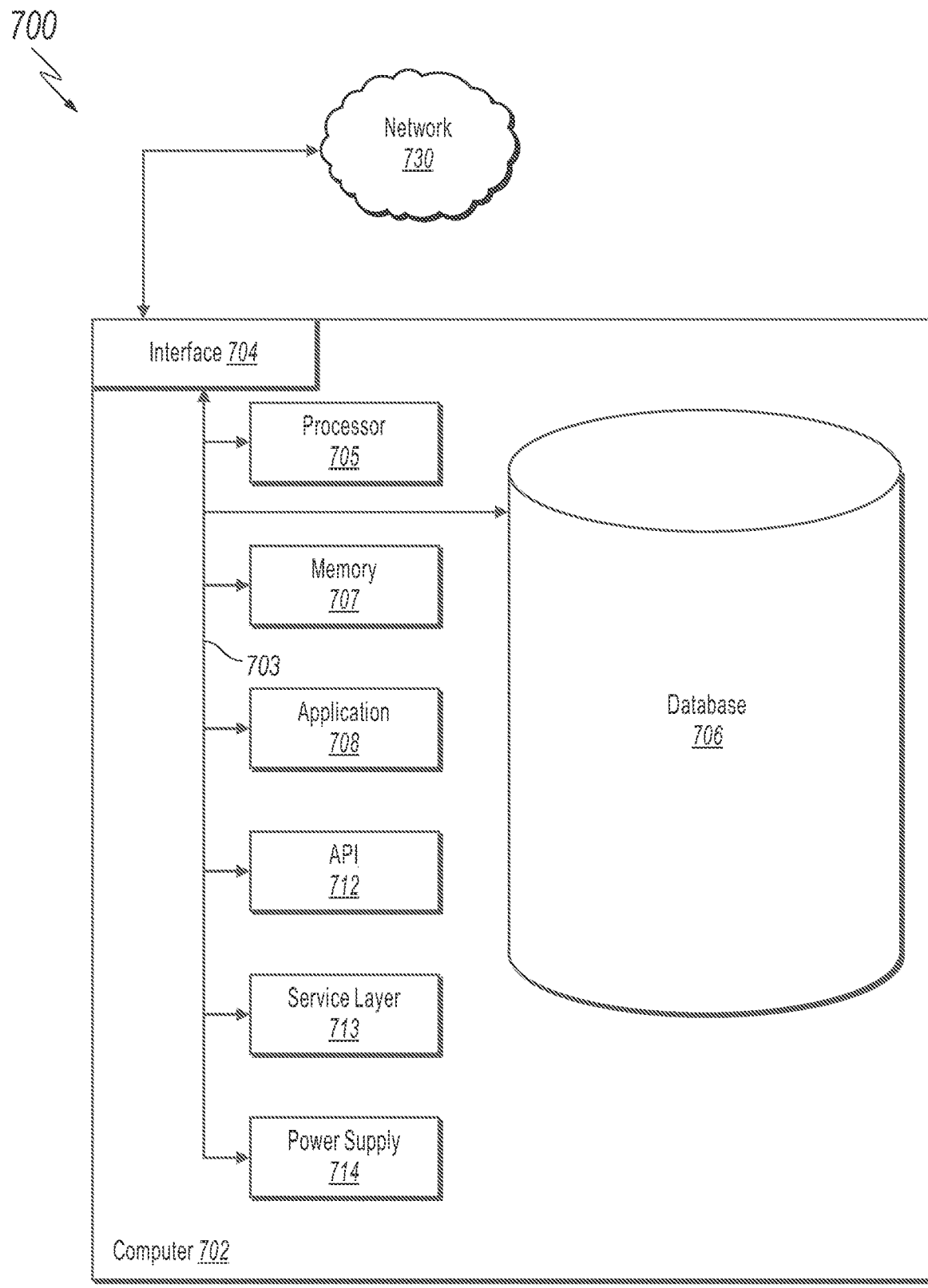
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented system 700 used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 702 can include an input device, such as a keypad, keyboard, or touch screen, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as, for example, a client, network component, a server, or a database or another persistency, or a combination of roles for performing the subject matter described in the present disclosure. The illustrated computer 702 is communicably coupled with a network 730. In some implementations, one or more components of the computer 702 can be configured to operate within an environment, or a combination of environments, including cloud-computing, local, or global.

At a high level, the computer 702 is an electronic computing device operable to receive, transmit, process, store, or manage data and information associated with the described subject matter. According to some implementations, the computer 702 can also include or be communicably coupled with a server, such as an application server, e-mail server, web server, caching server, or streaming data server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a System Bus 703. In some implementations, any or all of the components of the computer 702, including hardware, software, or a combination of hardware and software, can interface over the System Bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using the service layer 713. Software services, such as those provided by the service layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or hardware of interface 704 is operable to communicate physical signals within and outside of the illustrated computer 702.

The computer 702 includes a processor 705. Although illustrated as a single processor 705, two or more processors 705 can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory or conventional database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707, two or more Memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: displaying a first portion of a diagram within a diagram window of a display device, wherein the diagram comprises a set of shapes and a set of connectors representing a corresponding set of relationships between a set of objects; detecting that a first shape of the set of shapes at a first position of the first shape and a first status indicator associated with the first shape at a first position of the first status indicator are at least partially outside a first visible portion of the diagram within the diagram window; determining a second position of the first status indicator within the diagram window, wherein the second position of the first status indicator is on a first line segment from the first position of the first status indicator to a representative position within the diagram window, and is on a first edge region of the diagram window; and displaying the first edge region of the diagram window and the first status indicator at the second position of the first status indicator within the diagram window.

The foregoing and other described implementations can each, optionally, include one or more of the following features:

A first feature, combinable with any of the following features, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising: a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

A second feature, combinable with any of the previous or following features, wherein determining the second position of the first status indicator within the diagram window further comprises: determining which edge region of four edge regions of the diagram window is the first edge region, wherein: when the first position of the first status indicator is within the right sector of the diagram, the first edge region is a corresponding right edge region of the diagram window; when the first position of the first status indicator is within the left sector of the diagram, the first edge region is a corresponding left edge region of the diagram window; when the first position of the first status indicator is within the top sector of the diagram, the first edge region is a corresponding top edge region of the diagram window; or when the first position of the first status indicator is within the bottom sector of the diagram, the first edge region is a corresponding bottom edge region of the diagram window, wherein the right sector further comprises an area within the diagram window and an area outside the diagram window, wherein the left sector further comprises an area within the diagram window and an area outside the diagram window, wherein the top sector further comprises an area within the diagram window and an area outside the diagram window, and wherein the bottom sector further comprises an area within the diagram window and an area outside the diagram window.

A third feature, combinable with any of the previous or following features, wherein determining the second position of the first status indicator within the diagram window further comprises: determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

A fourth feature, combinable with any of the previous or following features, further comprising: when the first status indicator is at the second position of the first status indicator within the diagram window, receiving a selection of the first status indicator; in response to receiving the selection of the first status indicator: determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and determining a second position of the first shape within the diagram window based on the third position of the first status indicator, wherein the first status indicator at the third position of the first status indicator is anchored to the first shape at the second position of the first shape; and moving the diagram in relation to moving the first status indicator at the second position of the first status indicator to the third position of the first status indicator within the diagram window, wherein a second visible portion of the moved diagram is within the diagram window; and displaying the first shape at the second position of the first shape within the diagram window and the first status indicator at the third position of the first status indicator anchored to the first shape within the diagram window.

A fifth feature, combinable with any of the previous or following features, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises: when the first margin region is a corresponding top margin region of the diagram window or a corresponding bottom margin region of the diagram window: when the first margin region is a corresponding top margin region of the diagram window, moving the first status indicator vertically downward to a vertical position of the third position of the first status indicator that is equal to or less than a vertical position of a bottom side of the top margin region within the diagram window; when the first margin region is a corresponding bottom margin region of the diagram window, moving the first status indicator vertically upward to a vertical position of the third position of the first status indicator that is equal to or greater than a vertical position of a top side of the bottom margin region within the diagram window; and in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and when the first margin region is a corresponding right margin region of the diagram window or a corresponding left margin region of the diagram window: when the first margin region is a corresponding right margin region of the diagram window, moving the first status indicator horizontally leftward to the horizontal position of the third position of the first status indicator that is equal to or less than the horizontal position of the left side of the right margin region of the diagram window; when the first margin region is a corresponding left margin region of the diagram window, moving the first status indicator horizontally rightward to a horizontal position of the third position of the first status indicator that is equal to or greater than the horizontal position of the right side of the left margin region of the diagram window; and in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

A sixth feature, combinable with any of the previous or following features, wherein the representative position within the diagram window is the center of the diagram window, wherein the width of the first edge region is greater than or equal to the width of the first status indicator, wherein the set of shapes represent a corresponding set of objects of a model, and wherein the set of connectors further represent a corresponding set of relationships between the corresponding set of objects of the model, and wherein a status indicator comprises a status indicator identification (ID) and status indicator information, wherein the status indicator information comprises at least one of a searched shape status, a bookmarked shape status, a warning associated with the shape, an error associated with the shape, an information message associated with the shape, or a comment associated with the shape.

In a second implementation, a computer-implemented system, comprising: one or more processors; and one or more computer memory devices interoperably coupled with the one or more processors and having tangible, non-transitory, machine-readable media storing one or more instructions that, when executed by the one or more computers, perform one or more operations comprising: displaying a first portion of a diagram within a diagram window of a display device, wherein the diagram comprises a set of shapes and a set of connectors representing a corresponding set of relationships between a set of objects; detecting that a first shape of the set of shapes at a first position of the first shape and a first status indicator associated with the first shape at a first position of the first status indicator are at least partially outside a first visible portion of the diagram within the diagram window; determining a second position of the first status indicator within the diagram window, wherein the second position of the first status indicator is on a first line segment from the first position of the first status indicator to a representative position within the diagram window, and is on a first edge region of the diagram window; and displaying the first edge region of the diagram window and the first status indicator at the second position of the first status indicator within the diagram window.

The foregoing and other described implementations can each, optionally, include one or more of the following features:

A first feature, combinable with any of the following features, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising: a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

A second feature, combinable with any of the previous or following features, wherein determining the second position of the first status indicator within the diagram window further comprises: determining which edge region of four edge regions of the diagram window is the first edge region, wherein: when the first position of the first status indicator is within the right sector of the diagram, the first edge region is a corresponding right edge region of the diagram window; when the first position of the first status indicator is within the left sector of the diagram, the first edge region is a corresponding left edge region of the diagram window; when the first position of the first status indicator is within the top sector of the diagram, the first edge region is a corresponding top edge region of the diagram window; or when the first position of the first status indicator is within the bottom sector of the diagram, the first edge region is a corresponding bottom edge region of the diagram window, wherein the right sector further comprises an area within the diagram window and an area outside the diagram window, wherein the left sector further comprises an area within the diagram window and an area outside the diagram window, wherein the top sector further comprises an area within the diagram window and an area outside the diagram window, and wherein the bottom sector further comprises an area within the diagram window and an area outside the diagram window.

A third feature, combinable with any of the previous or following features, wherein determining the second position of the first status indicator within the diagram window further comprises: determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

A fourth feature, combinable with any of the previous or following features, further comprising: when the first status indicator is at the second position of the first status indicator within the diagram window, receiving a selection of the first status indicator; in response to receiving the selection of the first status indicator: determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and determining a second position of the first shape within the diagram window based on the third position of the first status indicator, wherein the first status indicator at the third position of the first status indicator is anchored to the first shape at the second position of the first shape; and moving the diagram in relation to moving the first status indicator at the second position of the first status indicator to the third position of the first status indicator within the diagram window, wherein a second visible portion of the moved diagram is within the diagram window; and displaying the first shape at the second position of the first shape within the diagram window and the first status indicator at the third position of the first status indicator anchored to the first shape within the diagram window.

A fifth feature, combinable with any of the previous or following features, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises: when the first margin region is a corresponding top margin region of the diagram window or a corresponding bottom margin region of the diagram window: when the first margin region is a corresponding top margin region of the diagram window, moving the first status indicator vertically downward to a vertical position of the third position of the first status indicator that is equal to or less than a vertical position of a bottom side of the top margin region within the diagram window; when the first margin region is a corresponding bottom margin region of the diagram window, moving the first status indicator vertically upward to a vertical position of the third position of the first status indicator that is equal to or greater than a vertical position of a top side of the bottom margin region within the diagram window; and in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and when the first margin region is a corresponding right margin region of the diagram window or a corresponding left margin region of the diagram window: when the first margin region is a corresponding right margin region of the diagram window, moving the first status indicator horizontally leftward to the horizontal position of the third position of the first status indicator that is equal to or less than the horizontal position of the left side of the right margin region of the diagram window; when the first margin region is a corresponding left margin region of the diagram window, moving the first status indicator horizontally rightward to a horizontal position of the third position of the first status indicator that is equal to or greater than the horizontal position of the right side of the left margin region of the diagram window; and in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

A sixth feature, combinable with any of the previous or following features, wherein the representative position within the diagram window is the center of the diagram window, wherein the width of the first edge region is greater than or equal to the width of the first status indicator, wherein the set of shapes represent a corresponding set of objects of a model, and wherein the set of connectors further represent a corresponding set of relationships between the corresponding set of objects of the model, and wherein a status indicator comprises a status indicator identification (ID) and status indicator information, wherein the status indicator information comprises at least one of a searched shape status, a bookmarked shape status, a warning associated with the shape, an error associated with the shape, an information message associated with the shape, or a comment associated with the shape.

In a third implementation, a non-transitory, computer-readable medium storing one or more instructions executable by a computer system to perform operations comprising: displaying a first portion of a diagram within a diagram window of a display device, wherein the diagram comprises a set of shapes and a set of connectors representing a corresponding set of relationships between a set of objects; detecting that a first shape of the set of shapes at a first position of the first shape and a first status indicator associated with the first shape at a first position of the first status indicator are at least partially outside a first visible portion of the diagram within the diagram window; determining a second position of the first status indicator within the diagram window, wherein the second position of the first status indicator is on a first line segment from the first position of the first status indicator to a representative position within the diagram window, and is on a first edge region of the diagram window; and displaying the first edge region of the diagram window and the first status indicator at the second position of the first status indicator within the diagram window.

The foregoing and other described implementations can each, optionally, include one or more of the following features:

A first feature, combinable with any of the following features, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising: a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

A second feature, combinable with any of the previous or following features, wherein determining the second position of the first status indicator within the diagram window further comprises: determining which edge region of four edge regions of the diagram window is the first edge region, wherein: when the first position of the first status indicator is within the right sector of the diagram, the first edge region is a corresponding right edge region of the diagram window; when the first position of the first status indicator is within the left sector of the diagram, the first edge region is a corresponding left edge region of the diagram window; when the first position of the first status indicator is within the top sector of the diagram, the first edge region is a corresponding top edge region of the diagram window; or when the first position of the first status indicator is within the bottom sector of the diagram, the first edge region is a corresponding bottom edge region of the diagram window, wherein the right sector further comprises an area within the diagram window and an area outside the diagram window, wherein the left sector further comprises an area within the diagram window and an area outside the diagram window, wherein the top sector further comprises an area within the diagram window and an area outside the diagram window, and wherein the bottom sector further comprises an area within the diagram window and an area outside the diagram window.

A third feature, combinable with any of the previous or following features, wherein determining the second position of the first status indicator within the diagram window further comprises: determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

A fourth feature, combinable with any of the previous or following features, further comprising: when the first status indicator is at the second position of the first status indicator within the diagram window, receiving a selection of the first status indicator; in response to receiving the selection of the first status indicator: determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and determining a second position of the first shape within the diagram window based on the third position of the first status indicator, wherein the first status indicator at the third position of the first status indicator is anchored to the first shape at the second position of the first shape; and moving the diagram in relation to moving the first status indicator at the second position of the first status indicator to the third position of the first status indicator within the diagram window, wherein a second visible portion of the moved diagram is within the diagram window; and displaying the first shape at the second position of the first shape within the diagram window and the first status indicator at the third position of the first status indicator anchored to the first shape within the diagram window.

A fifth feature, combinable with any of the previous or following features, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises: when the first margin region is a corresponding top margin region of the diagram window or a corresponding bottom margin region of the diagram window: when the first margin region is a corresponding top margin region of the diagram window, moving the first status indicator vertically downward to a vertical position of the third position of the first status indicator that is equal to or less than a vertical position of a bottom side of the top margin region within the diagram window; when the first margin region is a corresponding bottom margin region of the diagram window, moving the first status indicator vertically upward to a vertical position of the third position of the first status indicator that is equal to or greater than a vertical position of a top side of the bottom margin region within the diagram window; and in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and when the first margin region is a corresponding right margin region of the diagram window or a corresponding left margin region of the diagram window: when the first margin region is a corresponding right margin region of the diagram window, moving the first status indicator horizontally leftward to the horizontal position of the third position of the first status indicator that is equal to or less than the horizontal position of the left side of the right margin region of the diagram window; when the first margin region is a corresponding left margin region of the diagram window, moving the first status indicator horizontally rightward to a horizontal position of the third position of the first status indicator that is equal to or greater than the horizontal position of the right side of the left margin region of the diagram window; and in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system.

Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   displaying a first visible portion of a diagram within a diagram window of a display device, wherein the diagram comprises a set of shapes and a set of connectors representing a corresponding set of relationships between a set of objects;
   detecting that both a first shape of the set of shapes at a first position of the first shape and a first status indicator associated with the first shape at a first position of the first status indicator are at least partially outside the first visible portion of the diagram within the diagram window; and
   in response to detecting that both the first shape and the first status indicator are at least partially outside the first visible portion of the diagram window:
      determining a second position of the first status indicator within the diagram window, wherein the second position of the first status indicator is: 1) on a first line segment from the first position of the first status indicator that is at least partially outside the first visible portion of the diagram to a representative position currently in view within the visible first portion of the diagram within the diagram window, and 2) on a first edge region of the diagram window;
      displaying the first edge region of the diagram window; and
      moving the first status indicator to the second position of the first status indicator within the diagram window.

2. The computer-implemented method of claim 1, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising:
   a right sector comprising the upper right corner, the intersection point, and the lower right corner,
   a bottom sector comprising the lower right corner, the intersection point, and the lower left corner,
   a left sector comprising the upper left corner, the intersection point, and the lower left corner, and
   a top sector comprising the upper left corner, the intersection point, and the upper right corner.

3. The computer-implemented method of claim 2, wherein determining the second position of the first status indicator within the diagram window further comprises:
   determining which edge region of four edge regions of the diagram window is the first edge region, wherein:
      when the first position of the first status indicator is within the right sector of the diagram, the first edge region is a corresponding right edge region of the diagram window;
      when the first position of the first status indicator is within the left sector of the diagram, the first edge region is a corresponding left edge region of the diagram window;
      when the first position of the first status indicator is within the top sector of the diagram, the first edge region is a corresponding top edge region of the diagram window; or
      when the first position of the first status indicator is within the bottom sector of the diagram, the first edge region is a corresponding bottom edge region of the diagram window, wherein the right sector further comprises an area within the diagram window and an area outside the diagram window,
      wherein the left sector further comprises an area within the diagram window and an area outside the diagram window,
      wherein the top sector further comprises an area within the diagram window and an area outside the diagram window, and
      wherein the bottom sector further comprises an area within the diagram window and an area outside the diagram window.

4. The computer-implemented method of claim 1, wherein determining the second position of the first status indicator within the diagram window further comprises:
   determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

5. The computer-implemented method of claim 1, further comprising:
   when the first status indicator is at the second position of the first status indicator within the diagram window, receiving a selection of the first status indicator;
   in response to receiving the selection of the first status indicator:
      determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and
      determining a second position of the first shape within the diagram window based on the third position of the first status indicator, wherein the first status indicator at the third position of the first status indicator is anchored to the first shape at the second position of the first shape; and
      moving the diagram in relation to moving the first status indicator at the second position of the first status indicator to the third position of the first status indicator within the diagram window, wherein a second visible portion of the moved diagram is within the diagram window; and
      displaying the first shape at the second position of the first shape within the diagram window and the first status indicator at the third position of the first status indicator anchored to the first shape within the diagram window.

6. The computer-implemented method of claim 5, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises:
   when the first margin region is a corresponding top margin region of the diagram window or a corresponding bottom margin region of the diagram window:
      when the first margin region is a corresponding top margin region of the diagram window, moving the first status indicator vertically downward to a vertical position of the third position of the first status indicator that is equal to or less than a vertical position of a bottom side of the top margin region within the diagram window;

when the first margin region is a corresponding bottom margin region of the diagram window, moving the first status indicator vertically upward to a vertical position of the third position of the first status indicator that is equal to or greater than a vertical position of a top side of the bottom margin region within the diagram window; and in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and when the first margin region is a corresponding right margin region of the diagram window or a corresponding left margin region of the diagram window:

when the first margin region is a corresponding right margin region of the diagram window, moving the first status indicator horizontally leftward to the horizontal position of the third position of the first status indicator that is equal to or less than the horizontal position of the left side of the right margin region of the diagram window;

when the first margin region is a corresponding left margin region of the diagram window, moving the first status indicator horizontally rightward to a horizontal position of the third position of the first status indicator that is equal to or greater than the horizontal position of the right side of the left margin region of the diagram window; and in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

7. The computer-implemented method of claim 1, wherein
the representative position within the diagram window is the center of the diagram window, wherein
the width of the first edge region is greater than or equal to the width of the first status indicator, wherein
the set of shapes represent a corresponding set of objects of a model, and wherein the set of connectors further represent a corresponding set of relationships between the corresponding set of objects of the model, and wherein
a status indicator comprises a status indicator identification (ID) and status indicator information, wherein the status indicator information comprises at least one of a searched shape status, a bookmarked shape status, a warning associated with the shape, an error associated with the shape, an information message associated with the shape, or a comment associated with the shape.

8. A computer-implemented system, comprising:
one or more processors; and
one or more computer memory devices interoperably coupled with the one or more processors and having tangible, non-transitory, machine-readable media storing one or more instructions that, when executed by the one or more computers, perform one or more operations comprising:
displaying a first visible portion of a diagram within a diagram window of a display device, wherein the diagram comprises a set of shapes and a set of connectors representing a corresponding set of relationships between a set of objects;
detecting that both a first shape of the set of shapes at a first position of the first shape and a first status indicator associated with the first shape at a first position of the first status indicator are at least partially outside the first visible portion of the diagram within the diagram window; and
in response to detecting that both the first shape and the first status indicator are at least partially outside the first visible portion of the diagram window:
determining a second position of the first status indicator within the diagram window, wherein the second position of the first status indicator is: 1) on a first line segment from the first position of the first status indicator that is at least partially outside the first visible portion of the diagram to a representative position currently in view within the visible first portion of the diagram within the diagram window, and 2) on a first edge region of the diagram window;
displaying the first edge region of the diagram window; and
moving the first status indicator at the second position of the first status indicator within the diagram window.

9. The computer-implemented system of claim 8, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising:
a right sector comprising the upper right corner, the intersection point, and the lower right corner,
a bottom sector comprising the lower right corner, the intersection point, and the lower left corner, a left sector comprising the upper left corner, the intersection point, and the lower left corner, and a top sector comprising the upper left corner, the intersection point, and the upper right corner.

10. The computer-implemented system of claim 9, wherein determining the second position of the first status indicator within the diagram window further comprises:

determining which edge region of four edge regions of the diagram window is the first edge region, wherein:

when the first position of the first status indicator is within the right sector of the diagram, the first edge region is a corresponding right edge region of the diagram window;

when the first position of the first status indicator is within the left sector of the diagram, the first edge region is a corresponding left edge region of the diagram window;

when the first position of the first status indicator is within the top sector of the diagram, the first edge region is a corresponding top edge region of the diagram window; or when the first position of the first status indicator is within the bottom sector of the diagram, the first edge region is a corresponding bottom edge region of the diagram window, wherein the right sector further comprises an area within the diagram window and an area outside the diagram window, wherein the left sector further comprises an area within the diagram window and an area outside the diagram window, wherein the top sector further comprises an area within the diagram window and an area outside the diagram window, and wherein the bottom sector further comprises an area within the diagram window and an area outside the diagram window.

11. The computer-implemented system of claim 8, wherein determining the second position of the first status indicator within the diagram window further comprises:

determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

12. The computer-implemented system of claim 8, further comprising:

when the first status indicator is at the second position of the first status indicator within the diagram window, receiving a selection of the first status indicator;

in response to receiving the selection of the first status indicator:

determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and determining a second position of the first shape within the diagram window based on the third position of the first status indicator, wherein the first status indicator at the third position of the first status indicator is anchored to the first shape at the second position of the first shape;

and moving the diagram in relation to moving the first status indicator at the second position of the first status indicator to the third position of the first status indicator within the diagram window, wherein a second visible portion of the moved diagram is within the diagram window; and displaying the first shape at the second position of the first shape within the diagram window and the first status indicator at the third position of the first status indicator anchored to the first shape within the diagram window.

13. The computer-implemented system of claim 12, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises:

when the first margin region is a corresponding top margin region of the diagram window or a corresponding bottom margin region of the diagram window:

when the first margin region is a corresponding top margin region of the diagram window, moving the first status indicator vertically downward to a vertical position of the third position of the first status indicator that is equal to or less than a vertical position of a bottom side of the top margin region within the diagram window;

when the first margin region is a corresponding bottom margin region of the diagram window, moving the first status indicator vertically upward to a vertical position of the third position of the first status indicator that is equal to or greater than a vertical position of a top side of the bottom margin region within the diagram window; and in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and when the first margin region is a corresponding right margin region of the diagram window or a corresponding left margin region of the diagram window:

when the first margin region is a corresponding right margin region of the diagram window, moving the first status indicator horizontally leftward to the horizontal position of the third position of the first status indicator that is equal to or less than the horizontal position of the left side of the right margin region of the diagram window;

when the first margin region is a corresponding left margin region of the diagram window, moving the first status indicator horizontally rightward to a horizontal position of the third position of the first status indicator that is equal to or greater than the horizontal position of the right side of the left margin region of the diagram window; and in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

14. The computer-implemented system of claim 8, wherein the representative position within the diagram window is the center of the diagram window, wherein the width of the first edge region is greater than or equal to the width of the first status indicator, wherein the set of shapes represent a corresponding set of objects of a model, and wherein the set of connectors further represent a corresponding set of relationships between the corresponding set of objects of the model, and wherein a status indicator comprises a status indicator identification (ID) and status indicator information, wherein the status indicator information comprises at least one of a searched shape status, a bookmarked shape status, a warning associated with the shape, an error associated with the shape, an information message associated with the shape, or a comment associated with the shape.

15. A non-transitory, computer-readable medium storing one or more instructions executable by a computer system to perform operations comprising:

displaying a first visible portion of a diagram within a diagram window of a display device, wherein the diagram comprises a set of shapes and a set of connectors representing a corresponding set of relationships between a set of objects;

detecting that both a first shape of the set of shapes at a first position of the first shape and a first status indicator associated with the first shape at a first position of the first status indicator are at least partially outside the first visible portion of the diagram within the diagram window; and in response to detecting that both the first shape and the first status indicator are at least partially outside the first visible portion of the diagram window:

determining a second position of the first status indicator within the diagram window, wherein the second position of the first status indicator is: 1) on a first line segment from the first position of the first status indicator that is at least partially outside the first visible portion of the diagram to a representative position currently in view within the visible first portion of the diagram within the diagram window, and 2) on a first edge region of the diagram window;

displaying the first edge region of the diagram window; and moving the first status indicator at the second position of the first status indicator within the diagram window.

16. The non-transitory, computer-readable medium of claim 15, wherein four sectors in the diagram are separated by a first line including an upper left corner and a lower right corner of the diagram window, a second line including an upper right corner and a lower left corner of the diagram window, and an intersection point at the intersection of the first line and the second line, wherein the four sectors comprising:

a right sector comprising the upper right corner, the intersection point, and the lower right corner, a bottom sector comprising the lower right corner, the intersection point, and the lower left corner, a left sector comprising the upper left corner, the intersection point, and the lower left corner, and a top sector comprising the upper left corner, the intersection point, and the upper right corner.

17. The non-transitory, computer-readable medium of claim 16, wherein determining the second position of the first status indicator within the diagram window further comprises:

determining which edge region of four edge regions of the diagram window is the first edge region, wherein:

when the first position of the first status indicator is within the right sector of the diagram, the first edge region is a corresponding right edge region of the diagram window;

when the first position of the first status indicator is within the left sector of the diagram, the first edge region is a corresponding left edge region of the diagram window;

when the first position of the first status indicator is within the top sector of the diagram, the first edge region is a corresponding top edge region of the diagram window; or when the first position of the first status indicator is within the bottom sector of the diagram, the first edge region is a corresponding bottom edge region of the diagram window, wherein the right sector further comprises an area within the diagram window and an area outside the diagram window, wherein the left sector further comprises an area within the diagram window and an area outside the diagram window, wherein the top sector further comprises an area within the diagram window and an area outside the diagram window, and wherein the bottom sector further comprises an area within the diagram window and an area outside the diagram window.

18. The non-transitory, computer-readable medium of claim 15, wherein determining the second position of the first status indicator within the diagram window further comprises:

determining a first edge region intersection point at the intersection of the first line segment and a first edge region line segment, wherein the first edge region line segment extends the length of the first edge region and is centered between the width of the first edge region; and assigning the second position of the first status indicator at the first edge region intersection point.

19. The non-transitory, computer-readable medium of claim 15, further comprising:
when the first status indicator is at the second position of the first status indicator within the diagram window, receiving a selection of the first status indicator;
in response to receiving the selection of the first status indicator:
determining a third position of the first status indicator within the diagram window based on the second position of the first status indicator and a first margin region of the diagram window, wherein the first margin region comprises the first edge region, and wherein the width of the first margin region is greater than or equal to the width of the first edge region; and
determining a second position of the first shape within the diagram window based on the third position of the first status indicator, wherein the first status indicator at the third position of the first status indicator is anchored to the first shape at the second position of the first shape; and
moving the diagram in relation to moving the first status indicator at the second position of the first status indicator to the third position of the first status indicator within the diagram window, wherein a second visible portion of the moved diagram is within the diagram window; and
displaying the first shape at the second position of the first shape within the diagram window and the first status indicator at the third position of the first status indicator anchored to the first shape within the diagram window.

20. The non-transitory, computer-readable medium of claim 19, wherein the first status indicator is anchored to the first shape within the first shape, on a border of the first shape, or outside the first shape and touching the border of the first shape, wherein the first shape at the second position of the first shape touches a first side of the first margin region within the diagram window, and wherein moving the first status indicator at the second position of the first status indicator to the third position of the first status indicator within the diagram window comprises:
when the first margin region is a corresponding top margin region of the diagram window or a corresponding bottom margin region of the diagram window:
when the first margin region is a corresponding top margin region of the diagram window, moving the first status indicator vertically downward to a vertical position of the third position of the first status indicator that is equal to or less than a vertical position of a bottom side of the top margin region within the diagram window;
when the first margin region is a corresponding bottom margin region of the diagram window, moving the first status indicator vertically upward to a vertical position of the third position of the first status indicator that is equal to or greater than a vertical position of a top side of the bottom margin region within the diagram window; and
in response to determining that a horizontal position of the second position of the first status indicator is less than a horizontal position of a right side of a left margin region of the diagram window, moving the first status indicator horizontally rightward to a horizontal position of the third position of the first status indicator that is equal to or greater than the horizontal position of the right side of the left margin region of the diagram window; or
in response to determining that the horizontal position of the second position of the first status indicator is greater than a horizontal position of a left side of a right margin region of the diagram window, moving the first status indicator horizontally leftward to the horizontal position of the third position of the first status indicator that is equal to or less than the horizontal position of the left side of the right margin region of the diagram window; and
when the first margin region is a corresponding right margin region of the diagram window or a corresponding left margin region of the diagram window:
when the first margin region is a corresponding right margin region of the diagram window, moving the first status indicator horizontally leftward to the horizontal position of the third position of the first status indicator that is equal to or less than the horizontal position of the left side of the right margin region of the diagram window;
when the first margin region is a corresponding left margin region of the diagram window, moving the first status indicator horizontally rightward to a horizontal position of the third position of the first status indicator that is equal to or greater than the horizontal position of the right side of the left margin region of the diagram window; and
in response to determining that the vertical position of the second position of the first status indicator is less than the vertical position of the top side of the bottom margin region within the diagram window, moving the first status indicator vertically upward to the vertical position of the third position of the first status indicator that is equal to or greater than the vertical position of the top side of the bottom margin region within the diagram window; or
in response to determining that the vertical position of the second position of the first status indicator is greater than the vertical position of the bottom side of the top margin region within the diagram window, moving the first status indicator vertically downward to the vertical position of the third position of the first status indicator that is equal to or less than the vertical position of the bottom side of the top margin region within the diagram window.

* * * * *